US011991795B2

(12) United States Patent
Xia et al.

(10) Patent No.: US 11,991,795 B2
(45) **Date of Patent: *May 21, 2024**

(54) HEATED THROW

(71) Applicant: Zhejiang Shuoqi Home Textile Products Co., Ltd., Zhejiang Province (CN)

(72) Inventors: Yibing Xia, Zhejiang Province (CN); Mingwen Qi, Zhejiang Province (CN); Tianming Luo, Zhejiang Province (CN)

(73) Assignee: Zhejiang Shuogi Home Textile Products Co., Ltd., Zhejiang Province (CN)

( * ) Notice: Subject to any disclaimer, the term of this patent is extended or adjusted under 35 U.S.C. 154(b) by 601 days.

This patent is subject to a terminal disclaimer.

(21) Appl. No.: 17/126,553

(22) Filed: Dec. 18, 2020

(65) Prior Publication Data

US 2022/0151028 A1 May 12, 2022

(30) Foreign Application Priority Data

Nov. 10, 2020 (CN) ........................ 202011245216.6

(51) Int. Cl.
*H05B 3/34* (2006.01)

(52) U.S. Cl.
CPC .................................... *H05B 3/342* (2013.01)

(58) Field of Classification Search
CPC ............................ H01R 13/502; H05B 1/0272
USPC .......................................................... 219/212
See application file for complete search history.

(56) References Cited

U.S. PATENT DOCUMENTS 1,644,306 A * 10/1927 Ledbetter ............. H02G 3/0683 16/108
2012/0193342 A1* 8/2012 Macher .................. H05B 3/342 219/211
2017/0239404 A1* 8/2017 Shavit ..................... B01F 31/86
2022/0151025 A1* 5/2022 Xia .......................... H05B 3/34

FOREIGN PATENT DOCUMENTS

CN 206152102 U * 5/2017
CN 107508065 A * 12/2017 ............ H01R 13/04
CN 110946449 A * 4/2020
CN 111011949 A * 4/2020
CN 211432042 U * 9/2020
CN 211657438 U * 10/2020

* cited by examiner

*Primary Examiner* — Janie M Loeppke
*Assistant Examiner* — Simpson A Chen

(57) ABSTRACT

The present disclosure discloses a heated throw. The heated throw includes rectangular shawl body with an electric heating layer laid inside. A connector which is electrically connected to the electric heating layer and a silicone key is fixed to a position, relatively close to a corner, on the shawl body. The silicone key is sewn on the shawl body to facilitate an operation and avoid a solution of directly operating by a controller, so that the heated throw is more convenient and fast to use. The electric heating layer and the silicone key are electrically connected to the connector. The connector is connected to a plug through the controller. The controller is used for controlling heating output of the electric heating layer, and exchanging heated throw state information and user control information with the silicone key through the connector.

8 Claims, 5 Drawing Sheets

HEATED THROW

CROSS-REFERENCE TO RELATED APPLICATIONS

The present application claims priority to the Chinese Patent Application No. 202011245216.6, filed with China National Intellectual Property Administration (CNIPA) on Nov. 10, 2020, and entitled "HEATED THROW", which is incorporated herein by reference in its entirety.

TECHNICAL FIELD

The present disclosure relates to the technical field of shawls, and in particular, to a heated throw.

BACKGROUND

A shawl is an article for daily use that people wear for proofing wind and keeping warm in cold winter. It is made by sewing soft and comfortable cloth or fabrics. In the prior art, in order to make the shawl have health care and heating functions, people also add an electric heating layer in the shawl to facilitate the use at home to provide better quality of life by using the heating of the electric heating layer. However, the traditional shawl with the electric heating layer drags a cumbersome controller, which affects the appearance of the overall shawl, is very inconvenient to operate, and cannot carry out shawl information communication, thereby seriously affecting the use experience of people.

SUMMARY

The objective of the present disclosure is to provide a heated throw, which is more convenient to use and lighter, and can transmit user control information and product state information.

To achieve the above Objective, the present disclosure provides the following solutions: A heated throw includes a rectangular shawl body (1) w with an electric heating layer (2) laid inside. A connector (3) which is electrically connected to the electric heating layer (2) and a silicone key (4) is fixed to a position, relatively close to a corner, on the shawl body (1). The silicone key (4) is sewn on the shawl body (1) to facilitate a manual pressing operation. The silicone key (4) is electrically connected to the connector (3). The connector (3) is connected to a plug (6) through a controller (5). The controller (5) is used for controlling heating output of the electric heating layer (2), and is further used for acquiring and sending the working state information of the shawl body (1) and receiving the user control information collected by the silicone key (4).

Optionally, the silicone key (4) and the connector (3) are arranged at the positions, relatively close to a diagonal line, on the shawl body (1).

Optionally, the silicone cone key (4) includes a key housing (41) and a button switch mounted in the key housing (41). A button window is formed in the top surface of the key housing (41). A key (42) which facilitates pressing the button switch is arranged it the button window.

Optionally, an electronic wire (X) is embedded in the shawl body (I). The button switch of the silicone key (4) is connected to the connector (3) through the electronic wire (X).

Optionally, the shawl body (1) is formed by sewing two layers of shawl fabrics (11). Both the electric heating layer (2) and the electronic wire (X) are sewn between the two layers of the shawl fabrics (11). The electric heating layer (2) is formed by a heating wire (21) between the two layers of the shawl fabrics (11).

Optionally, the connector (3) specifically includes:

a connector male end (31), a connector female end, a male end rubber coating (34), a connecting head (32), and a wire bushing (33).

The connector male end is connected with the connecting head (3 in a plug-in manner. The connector female end (31) is connected with the connecting head (32) in a buckling manner. The connector male end is arranged in the male end rubber coating (34). One end of the wire bushing (33) is connected to the connector female end (31). The other end of the wire bushing (33) is connected to the silicone key (4) and the heating wire (21). The male end rubber coating (34) is connected to the controller (5).

Optionally, the connector female end (31) specifically includes:

a female end upper cover (311), a PCB (312), a female terminal (313), and a female end lower cover (314).

A first end of the PCB (312) is connected to the wire bushing (33). A second end of the PCB (312) is connected to a first end of the female terminal (313). A second end of the female terminal (313) is connected to the connector male end. The female end upper cover (311) is arranged on the upper surface of the PCB (312). The female end lower cover (314) is arranged on the lower surface of the PCB (312). Both the female end upper cover (311) and the female end lower cover (314) are inserted into an inner cavity of the connecting head (32).

Optionally, the connector male end specifically includes:

a male end upper cover (351), a male terminal (352), and a male end lower cover (353).

The male end upper cover (351) is connected to the connecting head (32) in a buckling manner through a hanging hook. A second end of the female terminal (313) is connected to a first end of the male end upper cover (351). A second end of the male end upper cover (351) is connected to the male terminal (352). The male end upper cover (351), the male terminal (352), and the male end lower cover (353) are all arranged in an inner cavity of the male end rubber coating (34).

Optionally, the connector (3) further includes:

fixed blocks (35).

The fixed blocks (35) are arranged on two sides of the female end upper cover (311).

Compared with the prior art, the heated throw has the following beneficial effects:

The present disclosure provides the heated throw, including a rectangular shawl body with an electric heating layer laid inside. A connector which is electrically connected to the electric heating layer and a silicone key is fixed to a position, relatively close to a corner, on the shawl body. The silicone key is sewn on the shawl body to facilitate an operation and avoid a solution of directly operating by a controller, so that the heated throw is more convenient and fast to use.

The electric heating layer and the silicone key are electrically connected to the connector. The connector is connected to a plug through the controller. The controller is used for controlling heating output of the electric heating layer, and exchanging heated throw state information and user control information with the silicone key through the connector. The heated throw has the advantages that the use is more convenient, the shawl is lighter, and the silicone key and the controller can transmit the control information and the state information with each other.

The electric heating layer and the silicon key are electrically connected to the connector. The connector is connected to a plug through the controller. The controller is used for controlling heating output of the electric heating layer, and exchanging heated throw state information and user control information with the silicon key through the connector. The heated throw has the advantages that the use is more convenient, the shawl is lighter, and the silicon key and the controller can transmit the control information and the state information with each other.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

Figure 1:
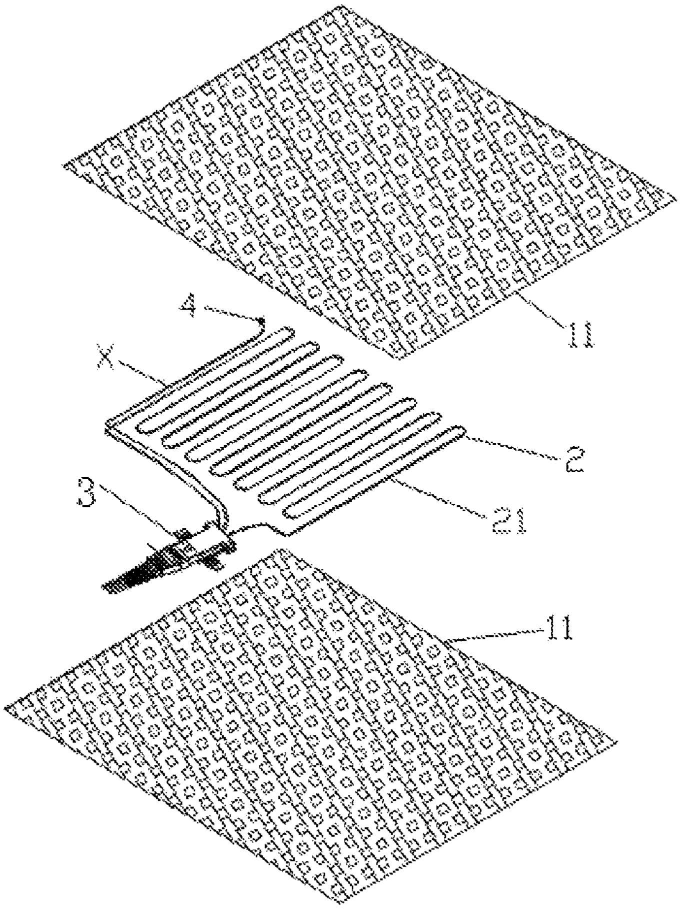
FIG. 1 is a decomposed structural schematic diagram of a heated throw of an embodiment of the present disclosure.

In the drawings: 1—shawl body, 11—shawl body fabric, 2—electric heating layer, 21—heating wire, 3—connector, 31—connector female end, 32—connecting head, 33—wire bushing, 34—male end rubber coating, 35—fixed block, 311—female end upper cover, 312—PCB, 313—female terminal, 314—female end lower cover, 351—male end upper cover, 352—male terminal, 353—male end lower cover, 4—silicone key, 41—key housing, 42—key, 5—controller, 6—plug, and X—electronic wire.

DETAILED DESCRIPTION

The technical solutions in the embodiments of the present disclosure will be clearly and completely described hereinbelow with the accompanying drawings in the embodiments of the present disclosure. It is apparent that the described embodiments are only part of the embodiments of the present disclosure, not all of the embodiments. On the basis of the embodiments of the present disclosure, all other embodiments obtained on the premise of no creative work of those of ordinary skill in the art fall within the scope of protection of the present disclosure.

The objective of the present disclosure is to provide a heated throw, which is more convenient to use and lighter, and can transmit user control information and product state information.

In order to make the above objective, features, and advantages of the present disclosure become more apparent and understood, the present disclosure is further described in detail below with reference to the drawings and specific implementation modes.

Embodiments

Figure 2:
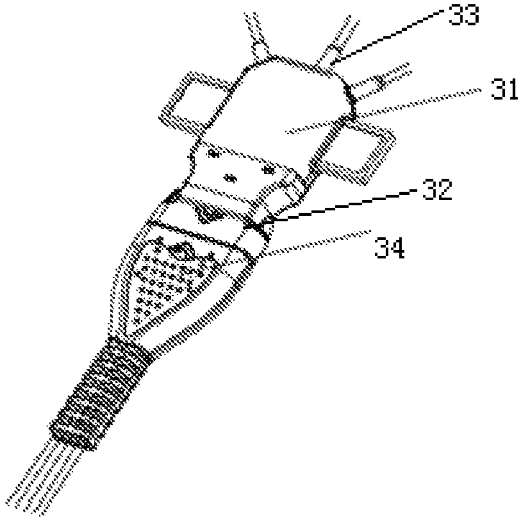
FIG. 2 is an overall schematic structural diagram of a connector of the embodiment of the present disclosure.
Figure 3:
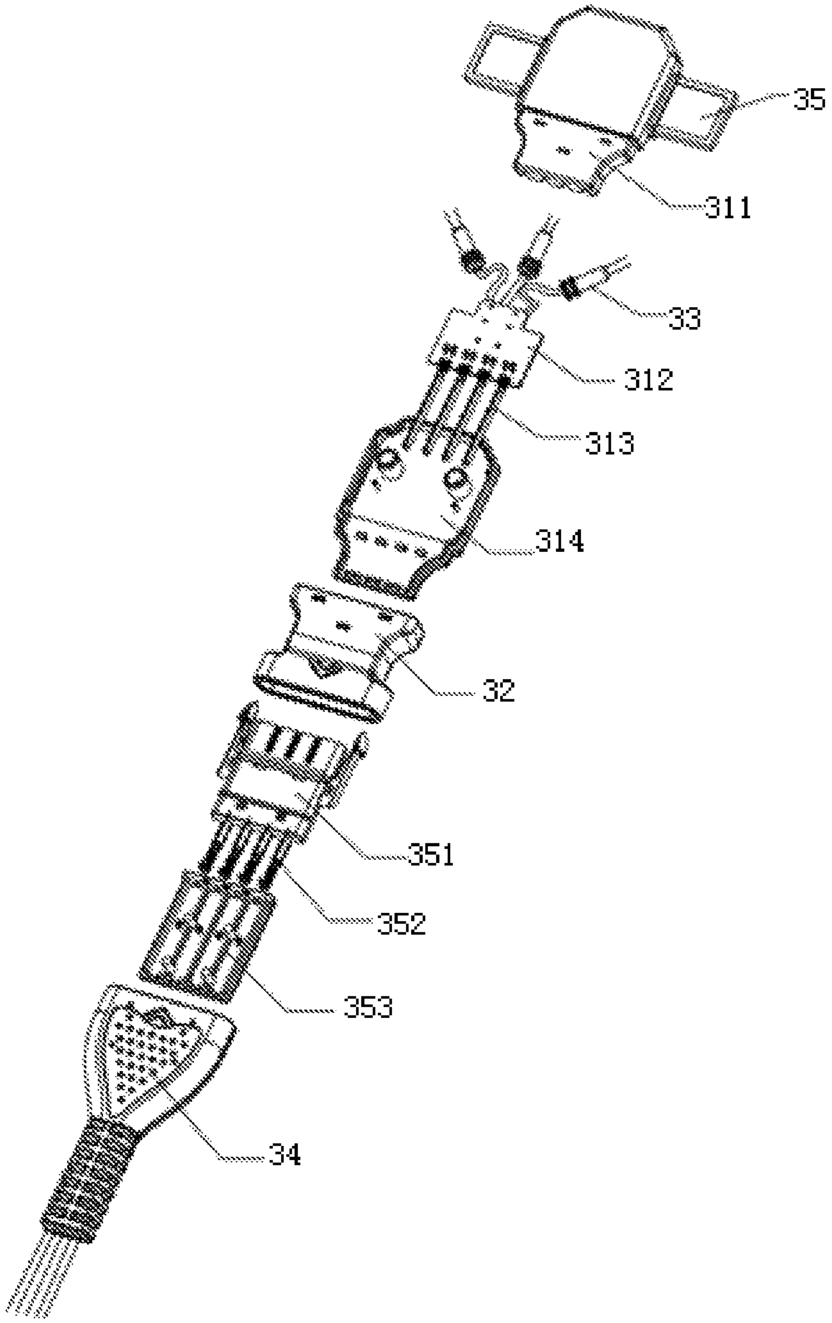
FIG. 3 is an exploded structural schematic diagram of the connector of the embodiment of the present disclosure.
Figure 4:
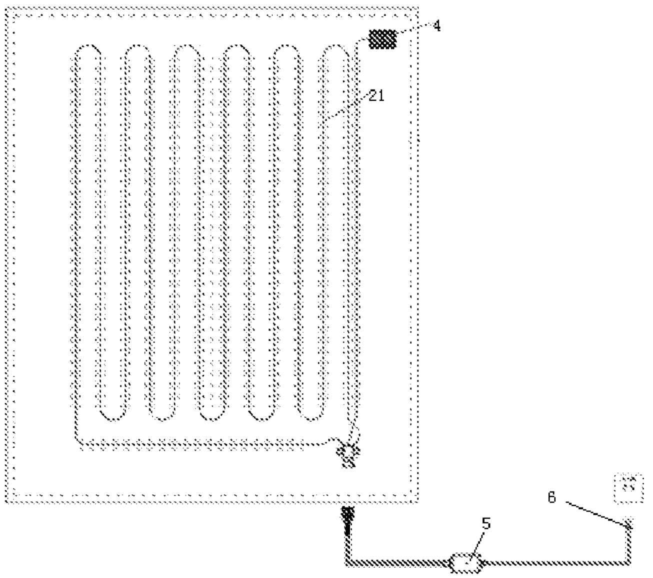
FIG. 4 is a schematic diagram of the electric connection of the heated throw of the embodiment of the present disclosure.
Figure 5:
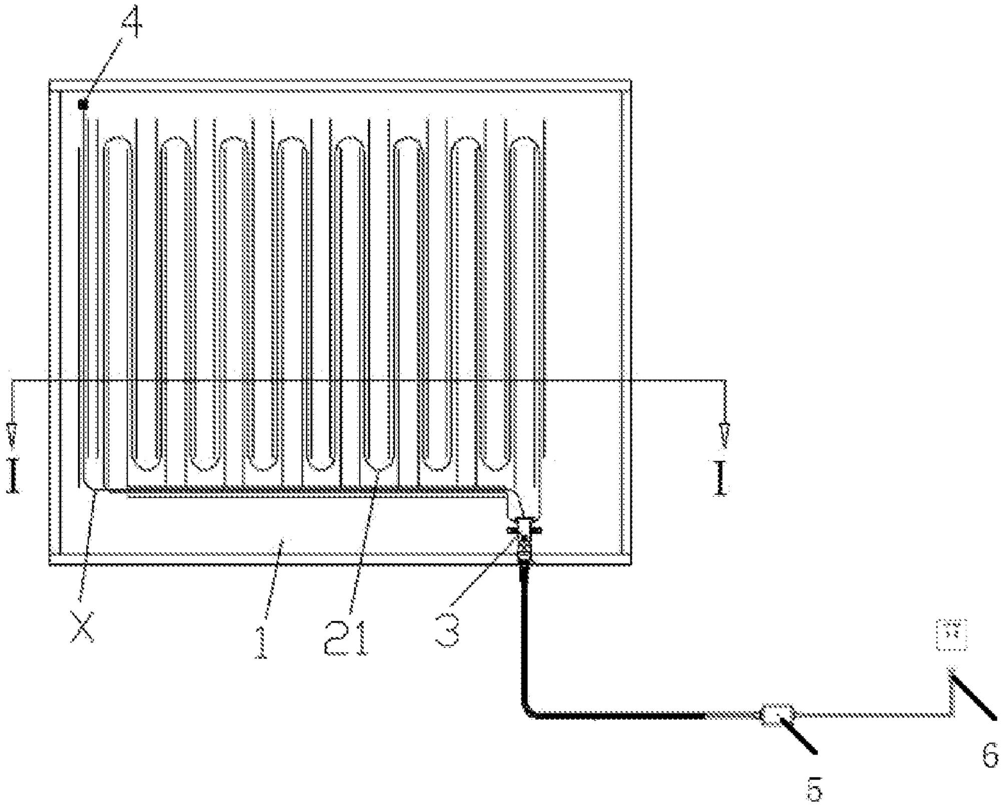
FIG. 5 is a schematic diagram of an internal structure of the heated throw of the embodiment of the present disclosure.
Figure 6:
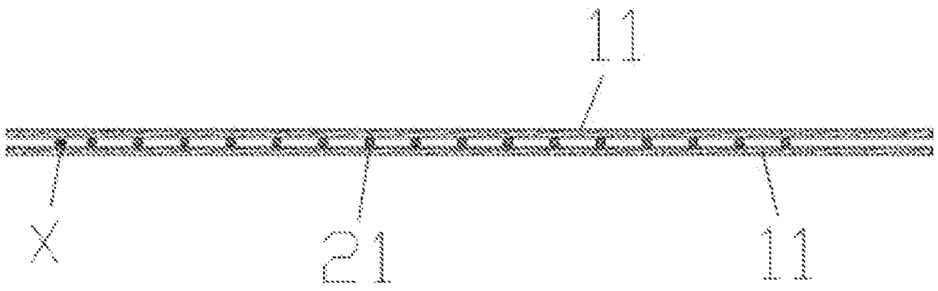
FIG. 6 is a sectional view of the internal structure of the heated throw of the embodiment of the present disclosure.
Figure 7:
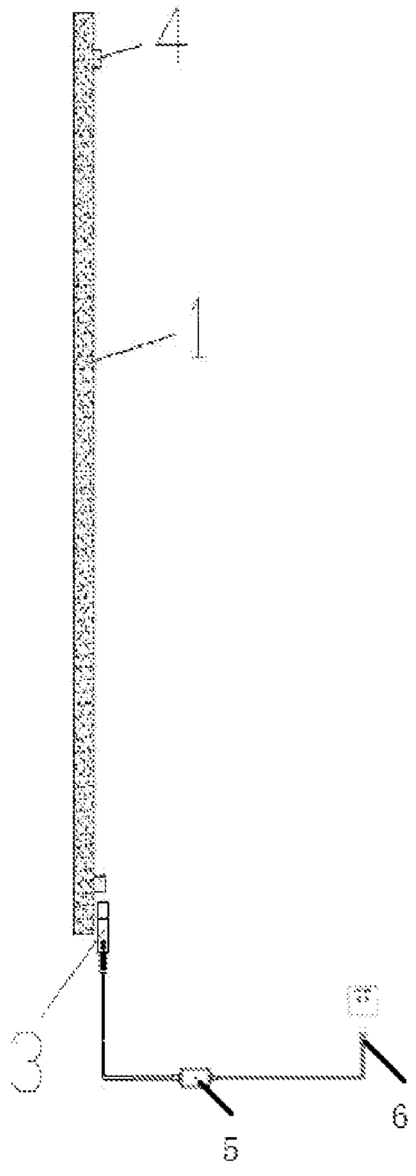
FIG. 7 is a side view of the heated throw of the embodiment of the present disclosure.
Figure 8:
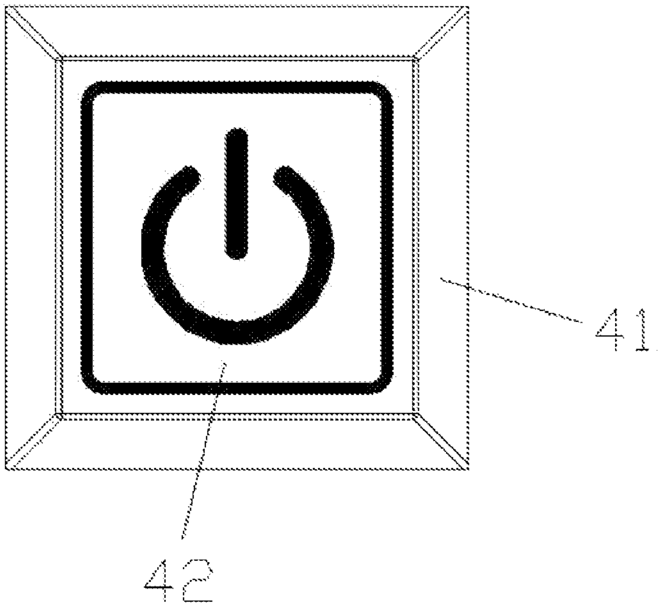
FIG. 8 is a vertical structural view of the silicone key of the embodiment of the present disclosure.

As shown in FIG. 1 to FIG. 8, the heated throw includes a rectangular shawl body 1 with an electric heating layer 2 laid inside. A connector 3 which is electrically connected to the electric heating layer 2 and a silicone key 4 is fixed to a position, relatively close to a corner, on the shawl body 1. The silicone key 4 is sewn on the shawl body 1 to facilitate pressing operation. The silicone key 4 is electrically connected to the connector 3. The connector 3 is connected to a plug 6 through a controller 5. The controller 5 is used for controlling heating output of the electric heating layer, and is further used for transmitting the state information of the heated throw body 1 and the user control information collected by the silicone key with the silicone key 4.

The silicone key 4 and the connector 3 are arranged at the positions, relatively close to a diagonal line, on the shawl body 1. The silicone key 4 includes a key housing 41 and a button switch mounted in the key housing 41. A button window is formed in the top surface of the key housing 41. A key 42 which facilitates pressing the button switch is arranged in the button window. An electronic X embedded in the shawl body 1. The button switch of the silicone key 4 is connected to the connector 3 through the electronic wire X. The shawl body 1 is formed by sewing two layers of shawl fabrics 11. Both the electric heating layer 2 and the electronic wire X are sewn between the two layers of the shawl fabrics 11. The electric heating layer 2 is formed by a heating Wire 21 between the two layers of the shawl fabrics 11.

A connector (3) specifically includes: a connector male end 31, a connector female end, a male end rubber coating 34, a connecting head 32, a wire bushing 33, and fixed blocks 35.

The connector male end is connected with the connecting head 32 in a plug-in manner. The connector female end 31 is connected with the connecting head 32 in a buckling manner. The connector male end is arranged in the male end lubber coating 34. One end of the wire bushing 33 is connected to the connector female end 31. The other end of the wire bushing 33 is connected to each of the silicone key 4 and the heating wire 21. The male end rubber coating 34 is connected to the controller 5.

The connector female end 31 specifically includes: a female end upper cover 311, a PCB 312, a female terminal 313, and a female end lower cover 314. A first end of the PCB 312 is connected to the wire bushing 33. A second end of the PCB 312 is connected to a first end of the female terminal 313. A second end of the female terminal 313 is connected to the connector male end. The female end upper cover 311 is arranged on the upper surface of the PCB 312. The female end lower cover 314 is arranged on the lower surface of the PCB 312. Both the female end upper cover 311 and the female end lower cover 314 are inserted into an inner cavity of the connecting head 32. The fixed blocks 35 are arranged on two sides of female end upper cover 311.

The connector male end specifically includes: a male end upper cover 351, a male terminal 352, and a male end lower cover 353. The male end upper cover 351 is connected to the connecting head 32 through a hanging hook. A second end of the female terminal 313 is connected to a first end of the male end upper cover 351. A second end of the male end upper cover 351 is connected to the male terminal 352. The male terminal 352 is arranged on the male end lower cover 353. The male end upper cover 351, the male terminal 352, and the male end lower cover 353 are all arranged in an inner cavity of the male end rubber coating 34.

In order to make the shawl more convenient to use, lighter, and more attractive, a control mode that the controller and the silicone key interact with each other is designed to control normal work of the shawl. A silicone key form is adopted and is sewn at the position, convenient to operate, of the shawl body lightly and conveniently, which is mainly in charge of collecting the control intention of turning on or off by the user. The controller is connected through a tour-core cable. The use experience of the product is greatly improved. The heated throw effectively solves the technical problem that the traditional shawl has to drag a cumbersome controller, which can make the user use more conveniently, and is safe and reliable. In addition, the heated throw can transmit the control information (for example, switch information, temperature adjustment information, and time control) acquired by the silicone key and the state information (for example, temperature information, failure information, and the like) of the heated throw acquired by the controller in two ways through the cable. The controller can further control the power of the electric heating output, and finally, achieves the purpose of controlling each heating shill position at a constant temperature.

In this specification, specific examples are used to describe the principle and implementation modes of the present disclosure. The description of the embodiments above is only intended to help understand the method and core idea of the present disclosure. In addition, a person of ordinary skill in the art may make modifications based on the idea of the present disclosure with respect to the specific implementation modes and the application scope. In conclusion, the content of this specification shall not be construed as a limitation to the present disclosure.

What is claimed is:

1. A heated throw, comprising a rectangular shawl body with an electric heating layer laid inside, wherein a connector which is electrically connected to the electric heating layer and a silicone key is fixed to a position, relatively close to a corner, on the shawl body;

the silicone key is sewn on the shawl body; the silicone key is electrically connected to the connector; the connector is connected to a plug through a controller; the controller is used for controlling heating output of the electric heating layer, and is further used for acquiring and sending working state information of the shawl body and receiving the user control information collected by the silicone key, wherein the working state information comprises temperature information and failure information of the shawl body;

wherein the connector comprises a connector male end, a connector female end, a connecting head, and a wire bushing;

wherein the connector female end comprises;

a female end upper cover, a PCB, a female terminal, and a female end lower cover;

a first end of the PCB connected to the wire bushing; a second end of the PCB connected to a first end of the female terminal; a second end of the female terminal connected to the connector male end; the female end upper confer is arranged on the upper surface of the PCB; the female end lower cover is arranged on the lower surface of the PCB; both the female end upper cover and the female end lower cover are inserted into an inner cavity of the connected head.

2. The heated throw according to claim 1, wherein the silicone key and the connector are arranged on diagonal lines of the shawl body.

3. The heated throw according to claim 2, wherein the silicone comprises:

a key housing and a button switch mounted in the key housing;

a button window formed in the top surface of the key housing; and a key which facilitates pressing the button switch arranged in the button window.

4. The heated throw according to claim 3, wherein an electronic wire is embedded in the shawl body; the button switch of the silicone key is connected to the connector through the electronic wire.

5. The heated throw according to claim 4, wherein the shawl body is formed by sewing two layers of shawl fabrics; both the electric heating layer and the electronic wire are sewn between the two layers of the shawl fabrics; the electric heating layer is formed by a heating wire between the two layers of the shawl fabrics.

6. The heated throw according to claim 5, wherein the connector further comprises;

a male end rubber coating;

the connector male end is connected with the connecting head in a plug-in manner; the connector female end is connected with the connecting head in a buckling manner; the connector male end is arranged in the male end rubber coating; one end of the wire bushing is connected to the connector female end; the other end of the wire bushing is connected to the silicone key and, the heating wire; the male end rubber coating is connected to the controller.

7. The heated throw according to claim 6, wherein the connector male end comprises:

a male end upper cover, a male terminal 6, and a male end lower cover;

the male end upper cover is connected to the connecting head through a hanging hook; the second end of the female terminal is connected to a first end of the male end upper cover; a second end of the male end upper cover is connected to the male terminal; the male end upper cover, the male terminal, and the male end lower cover are all arranged in an inner cavity of the male end rubber coating.

8. The heated throw according to claim 7, wherein the connector further comprises:

fixed blocks, wherein the fixed blocks are arranged on two sides of the female end upper cover.

* * * * *